(12) United States Patent
Myers, Jr.

(10) Patent No.: US 6,748,679 B2
(45) Date of Patent: Jun. 15, 2004

(54) SHELLFISH DREDGING APPARATUS

(76) Inventor: Arthur R. Myers, Jr., 2637 Pamlico Loop, Virginia Beach, VA (US) 23456

( * ) Notice: Subject to any disclaimer, the term of this patent is extended or adjusted under 35 U.S.C. 154(b) by 0 days.

(21) Appl. No.: 10/097,033

(22) Filed: Mar. 14, 2002

(65) Prior Publication Data

US 2003/0172557 A1 Sep. 18, 2003

(51) Int. Cl.[7] .................................................. E02F 3/88
(52) U.S. Cl. ............................. 37/315; 37/321; 37/323
(58) Field of Search ................................. 209/311, 313, 209/353, 354; 37/307, 314, 315, 317, 320, 321, 322, 323

(56) References Cited

U.S. PATENT DOCUMENTS

| | | | |
|---|---|---|---|
| 1,415,113 A | | 5/1922 | Phillips, Jr. |
| 2,076,823 A | | 4/1937 | Newell |
| 2,125,740 A | * | 8/1938 | Schacht .......................... 37/322 |
| 2,204,584 A | * | 6/1940 | Flower ......................... 119/235 |
| 3,010,232 A | | 11/1961 | Skakel et al. |
| 3,184,866 A | | 5/1965 | McMillin |
| 3,456,371 A | | 7/1969 | Graham et al. |
| 3,624,932 A | | 12/1971 | Doyle |
| 3,646,694 A | * | 3/1972 | Beck, Jr. ....................... 37/195 |
| 3,808,779 A | * | 5/1974 | Randall ............................ 56/9 |
| 4,070,061 A | * | 1/1978 | Obolensky ...................... 299/8 |
| 4,227,863 A | * | 10/1980 | Sommerer ................... 417/169 |
| 4,316,680 A | * | 2/1982 | Phipps et al. .................. 406/49 |
| 4,322,897 A | | 4/1982 | Brassfield |
| 4,681,372 A | * | 7/1987 | McClure .......................... 299/8 |
| 4,839,061 A | * | 6/1989 | Manchak Jr. et al. ......... 210/743 |
| 5,361,528 A | | 11/1994 | Peacock |
| 5,366,092 A | * | 11/1994 | Schmidt, Sr. ................. 209/17 |
| 5,546,682 A | * | 8/1996 | Skerry ........................... 37/322 |
| 5,593,252 A | * | 1/1997 | Relin et al. .................... 406/85 |
| 5,970,635 A | * | 10/1999 | Wilmoth ........................ 37/323 |
| 6,058,630 A | * | 5/2000 | Brown ........................... 37/322 |
| 6,178,670 B1 | * | 1/2001 | Susman et al. ................ 37/313 |
| 6,209,965 B1 | * | 4/2001 | Borns et al. ..................... 299/8 |
| 6,237,259 B1 | * | 5/2001 | Myers, II ....................... 37/315 |

FOREIGN PATENT DOCUMENTS

JP      56-64040    * 6/1981

* cited by examiner

Primary Examiner—Victor Batson
(74) Attorney, Agent, or Firm—Bacon & Thomas, PLLC (57) ABSTRACT

Apparatus for dredging shellfish from the bottom of a body of water includes a source of pressurized water, at least one water jet arranged to receive water from the pressurized water source and direct it at shellfish-containing sediments, sorting plates for receiving the shellfish-containing sediments excavated by the at least one water jet and separating the shellfish from the sediments, a collection chamber for receiving the separated shellfish, and dual lifting compartments, one of which is connected to the pressurized water source for lifting shellfish from the collection chamber and entraining the shellfish for transport to the surface, and the other of which is arranged to received pressurized air for increasing the transport speed and lifting power while cushioning the shellfish as they are transported to the surface.

10 Claims, 6 Drawing Sheets

SHELLFISH DREDGING APPARATUS

BACKGROUND OF THE INVENTION

1. Field of the Invention

This invention relates to a dredging apparatus for extracting bottom-dwelling shellfish such as clams, oysters, mussels, cockles, and crabs from a sea, lake, or riverbed, and for continuously transporting the extracted shellfish to the surface.

More specifically, the invention relates to a hydraulic dredging apparatus that includes a source of pressurized water, at least one water jet arranged to receive water from the pressurized water source and direct it at shellfish-containing sediments, sorting plates for receiving the shellfish-containing sediments excavated by the water jet or jets and separating the shellfish from the sediments, a collection chamber for receiving the separated shellfish, and dual lifting compartments, one of which is connected to the pressurized water source for lifting shellfish from the collection chamber and entraining the shellfish for transport to the surface, and the other of which is arranged to received pressurized air for increasing the transport speed and lifting power while cushioning the shellfish as they are transported to the surface. Unlike previous hydraulic transport mechanisms, the dual-compartment air/water transport arrangement of the invention permits precise control of excavation and transport pressure, without the need for multiple air or water sources and/or manifolds.

2. Description of Related Art

Numerous attempts have been made to devise mechanical harvesters that move or that can be towed along the bottom of a body of water in order to harvest shellfish that live in colonies at the bottom. All of these devices seek to dredge shellfish such as clams, oysters, cockles, mussels, and/or crabs from the bottom of the body of water and either trap the shellfish for retrieval after the device is brought to the surface, or continuously transport the shellfish to the surface as the dredge is being towed along the bottom.

Common problems that the designers of these devices have attempted to solve include problems of efficiency, i.e., the relationship between power or effort expended and the amount of shellfish harvested, problems related to the cost and reliability of the device, which are often a function of complexity, and problems related to environmental damage caused by the device as it is towed across the sea, lake, or riverbed.

The earliest attempts at large-scale shellfish harvesting devices undoubtedly date back to prehistoric times and most likely involved diggers or tongs dragged along the bottom for scooping shellfish into a collection cage or basket that could then be brought to the surface and emptied. More sophisticated but nevertheless fundamentally similar examples of dredges of this type are still being used and are disclosed, for example, in U.S. Pat. Nos. 4,827,635, 4,425,723, and 3,226,854. Such dredges have the advantage of simplicity, but are relatively inefficient because of inherent limitations in the effectiveness of mechanical dredging devices, and the need to repeatedly bring the dredges to the surface to be emptied.

As early as Greek times, high pressure jets of water capable of slicing horizontal layers of sediment were being used to hydraulically harvest shellfish, the loosened or liquified mass of shellfish-containing sediments being sifted to separate the shellfish from the sediments, and the remaining shellfish being collected in a collection cage or basket before being brought to the surface. Such harvesters, which are also still in use, have the advantage of being able to dredge a relatively large area in less time than a purely mechanical harvester, although they still require the collection cage or basket to be periodically brought to the surface for emptying.

In order to avoid the need to periodically bring the dredge to the surface for removal of harvested shellfish, numerous generally unsuccessful attempts have been made to add conveyors that continuously and automatically convey recovered shellfish to the surface, either in connection with a purely mechanical harvester, or in connection with a harvester that uses a hydraulic digging action. These conveyors initially involved purely mechanical conveyance systems in the form of conveyor belts or escalators, but were limited to use in relatively shallow waters since systems of greater length involved intractable problems in handling and complexity. A recent example of a non-hydraulic dredge with a mechanical conveyor is disclosed in U.S. Pat. No. 4,464,851, while examples of hydraulic dredges with mechanical conveyors are disclosed in U.S. Pat. Nos. 2,508,087, 3,462,858, and 3,521,386.

Figure 1:
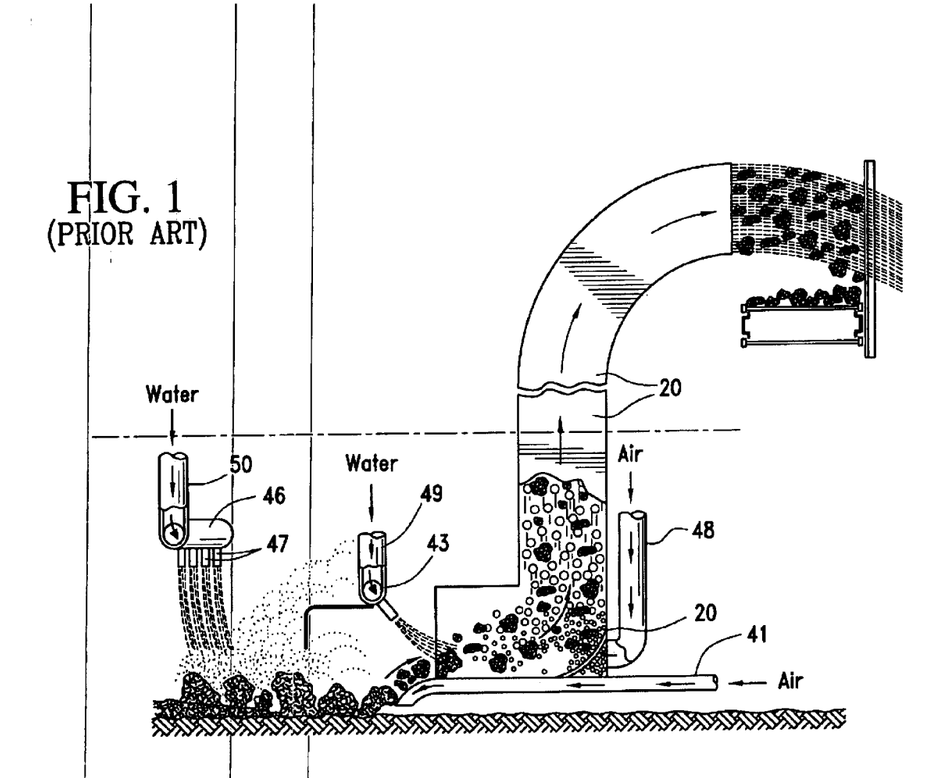
FIG. 1 is a schematic side view of the conventional shellfish dredging apparatus disclosed in U.S. Pat. No. 3,184,866.

In theory, hydraulic means of conveying extracted shellfish to the surface through pipes or hoses appear to offer greater simplicity and ease-of-handling than purely mechanical conveyance systems, and therefore the possibility of use at greater depths. However, in practice, most of the previously proposed hydraulic conveyance systems have suffered from slow speed, excess energy consumption and, in the case of systems that share water jets for both excavation and transport, difficulties in controlling excavation and transport pressures. For example, the system disclosed in U.S. Pat. No. 3,624,932 requires separate pumps, two corresponding pressurized water lines, and a transport hose to carry out excavation and transport of shellfish to the surface, resulting in relatively high power consumption and an increased possibility of tangling or breakage. The system disclosed in U.S. Pat. No. 3,184,866 utilizes both air and water for excavation as well as transport, and therefore requires even more hydraulic lines including, as illustrated in FIG. 1 appended hereto, two pressured water lines 49 and 50 with corresponding manifolds 43 and 46, two pressurized air lines 48 and 41, and a transport hose 20 to carry the excavated shellfish to the surface. Possibly because of the number of lines required, the system of U.S. Pat. No. 3,184,866 requires both a tow boat and a receiving boat or installation.

More recently, it has been proposed to use the same source of pressurized water for both the excavating jets and transport system of a hydraulic dredging apparatus, thereby eliminating the need for separate hydraulic lines and/or sources. The decrease in water pressure available for transport is compensated for by an improved transport system in which collected shellfish are siphoned rather than pushed or swept out of the collection chamber. Examples of systems in which jets of water are used to hydraulically separate shellfish from sediments, and also to create a siphon or Venturi effect that lifts the separated shellfish into a stream of water and carries them to the surface, are disclosed in British Patent Publication GB1,156,547 and U.S. Pat. No. 6,237,259. The latter system is illustrated in FIGS. 2 and 3, appended hereto.

In the system disclosed in U.S. Pat. No. 6,237,259, which was developed by the present inventor, the dredging apparatus includes a sled having a main frame 40 and a digging blade 21 that is inclined forwardly and downwardly relative to the frame so as to extend below the bottom of the frame into the sediments to be dredged. A digging jet pipe 22 is fixed relative to the front surface of the digging blade 21 and is arranged to discharge water under pressure on to the surface of the seabed immediately ahead of the digging blade to fluidize the sediments as they pass onto the blade. The angle of the digging blade 21 is such that a surface section of the seabed cut by the blade travels up the slope of the blade and into the open end or mouth 23 of the frame 40. Water to the digging jet 22 is supplied by a pump situated on a vessel through a hose 24 connected by suitable fittings to the digging jet. Extending rearwardly from digging blade 21 is a first separating device 25 made up of a plurality of horizontal bars 26,27,28 arranged in a direction generally parallel to a direction of travel of the apparatus as it is towed by a vessel, for separating shellfish collected by the digging blade from sediments in which the shellfish are entrained, and also for separating out immature shellfish having a size smaller than that of the shellfish to be collected. To the rear of the first separating device 25 is a second separating device 29 in the form of a plate 30 having a plurality of openings 31 arranged to permit passage of shellfish while excluding larger objects, including clumps of sediment not completely liquified by the digging water jet.

Figure 2:
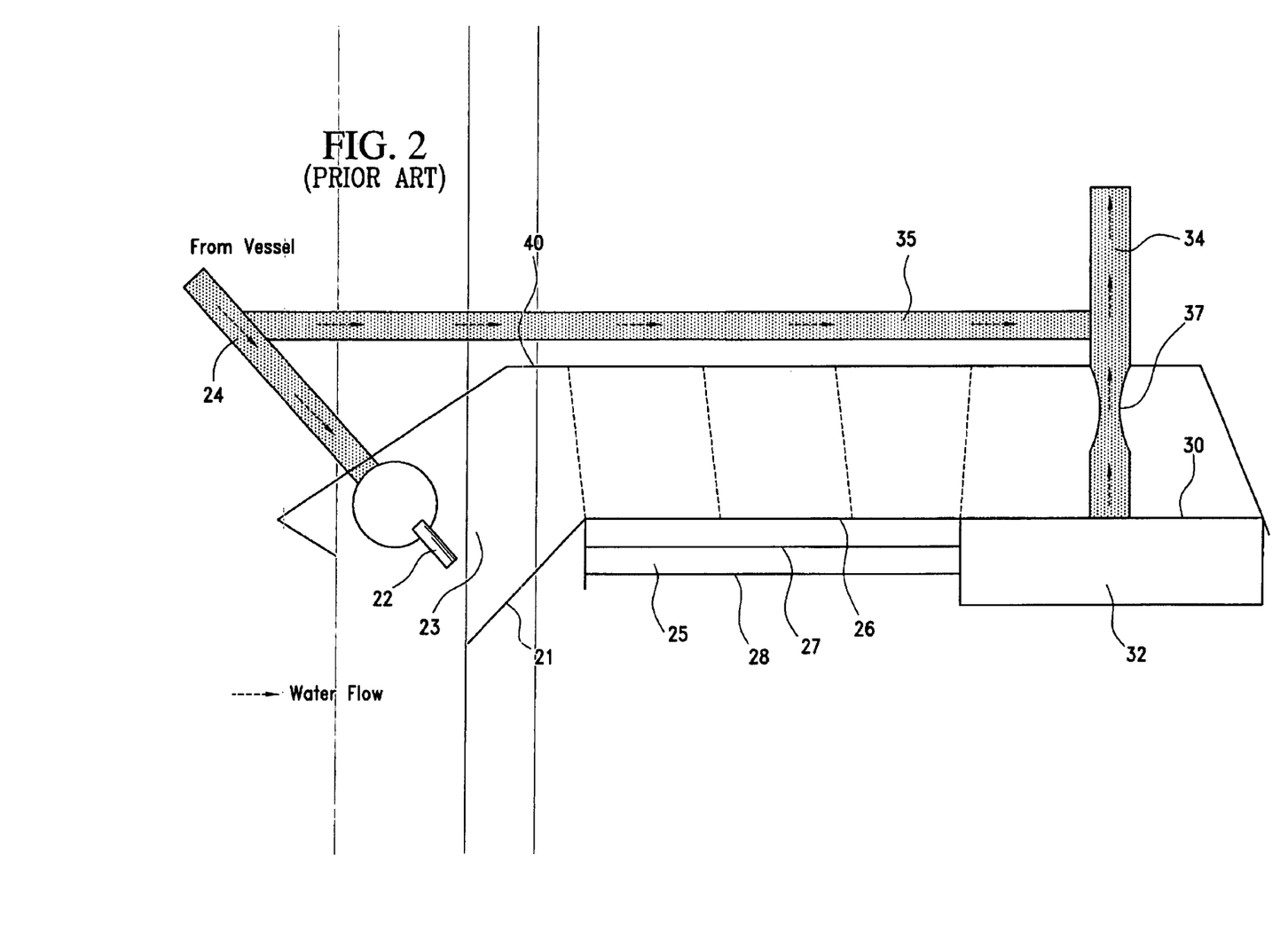
FIG. 2 is a schematic side view of the conventional shellfish dredging apparatus disclosed in U.S. Pat. No. 6,237,259.

The hydraulic transport system of the apparatus illustrated in FIGS. 1 and 2 includes a plate 30 that forms the top of a suction chamber 32 at the rear of the sled, and includes an opening 33 having a larger diameter than any of openings 31. Opening 33 is provided with a fitting for attachment of a transport tube 34 extending to the towing vessel. Transport tube 34 is connected by a hose or pipe 35 to the hose 24 that also supplies water to the digging jet. Nozzles 36 serve to direct pressurized water from hose or pipe 35 towards the surface in the direction of conveyance. The stream of water from the nozzles creates a siphon effect in the direction of arrow B to draw shellfish present in the suction chamber into the conveyance tube for transport to the towing vessel. A reduced diameter portion 37 of tube 34 situated immediately below the nozzles 36 increases the velocity of water being drawn past the nozzles so as to decrease the pressure in tube 34 in the area above suction chamber 32 and thereby increase the suction force and the efficiency by which shellfish in the suction chamber are transported to the surface.

Figure 3:
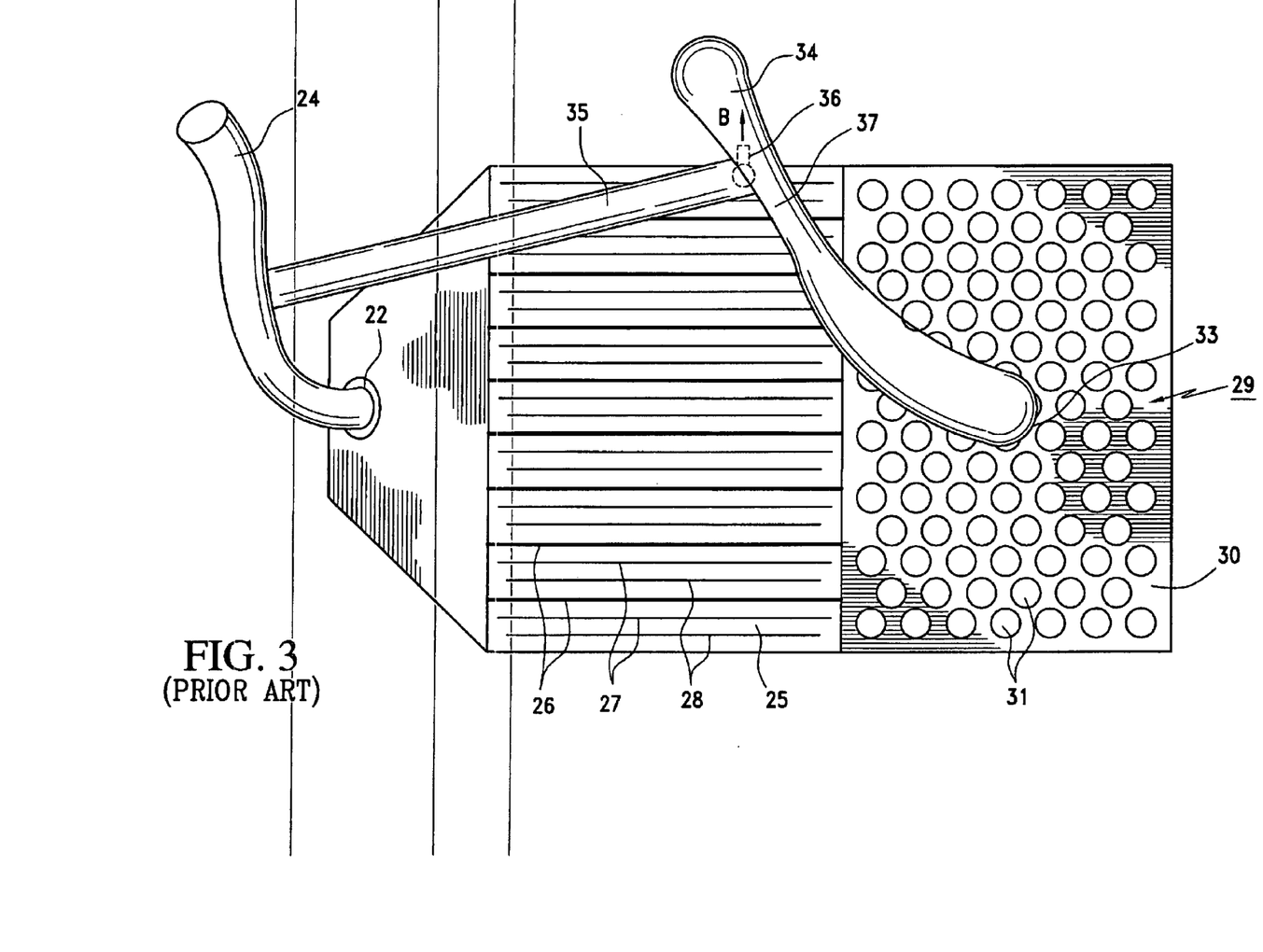
FIG. 3 is a plan view of the conventional shellfish dredging apparatus illustrated in FIG. 2.

While more energy efficient, versatile, easy-to-handle, and reliable than prior dredging apparatuses, the dredging apparatus illustrated in FIGS. 2 and 3 has the disadvantage that, in order to control the suction and lifting power of the transport conveyor to enable use of the conveyor at greater depths and in a wider variety of marine environments, it is necessary to increase or decrease the pressure supplied to the digging jet 22. The resulting variations in digging or excavation pressure make it difficult to control extraction, and may lead to excess energy use, undue disturbance of the bottom, and possibly damage to extracted shellfish or other marine organisms.

SUMMARY OF THE INVENTION

It is accordingly a first objective of the invention to provide a relatively low cost, high performance arrangement for harvesting shellfish from the bottom of a body of water, and for continuously conveying the harvested shellfish to a boat.

It is a second objective of the invention to provide an arrangement for harvesting shellfish from the bottom of a body of water in which conveyance of harvested shellfish to the surface is carried out primarily by the same source of hydraulic pressure that is used to extract shellfish from sediments, and yet that includes a secondary source of hydraulic pressure independent of the excavation pressure source that can be used to increase or control the transport pressure without varying the excavation pressure, thereby minimizing disturbance of the bottom and damage to the beds from which the shellfish are extracted, and/or to the shellfish being extracted, while permitting the apparatus to be used at arbitrary depths.

It is a third objective of the invention to provide an arrangement for conveying shellfish from a dredge to the surface at increased speeds and with minimal damage to the shellfish being conveyed.

It is a fourth objective of the invention to increase the lifting pressure of a hydraulic conveyor so as to minimize clogging or blockage.

It is a fifth objecting of the invention to provide a combined hydraulic excavation and transport system that offers a common source of excavation pressure and transport pressure, efficient suction-based lifting of excavated materials into the transport stream, and separate control of excavation and transport pressures.

These objectives are achieved by providing a shellfish harvesting apparatus in the form of a sled towed and equipped with hydraulic lines that direct pressurized water rearwardly relative to the direction of travel of the sled. The pressurized water sweeps sediments and shellfish towards a separator device that separates the shellfish from the sediments, after which the pressurized water sweeps the separated shellfish towards a suction chamber where the pressurized water creates a Venturi effect, causing shellfish entering the chamber to be transported to the surface through a trunk line.

According to the principles of a preferred embodiment of the invention, the suction chamber includes dual lifting compartments. The first compartment is situated above a collection chamber in the dredge and is arranged to receive a stream of pressurized water, which creates a Venturi effect that lifts shellfish from the collection chamber into the stream for transport through a hose to the surface. The second compartment is situated above the first compartment and is arranged to receive one or more air jets for adding velocity and lifting power to the transport stream, and for cushioning the shellfish as they make their way up the hose to the surface.

As a result, the present invention combines the efficiency and ease-of-handling of a siphon-based hydraulic dredging/ transport system of the type disclosed in U.S. Pat. No. 6,237,259, with the enhanced excavation and transport pressure control potentially offered by a systems having separate excavation and transport lines, such as the one disclosed in U.S. Pat. No. 3,184,866.

BRIEF DESCRIPTION OF THE DRAWINGS

FIG. 4 is a schematic side view of a dredging apparatus corresponding to the dredging apparatus illustrated in FIG.

2, but modified to include a dual compartment suction chamber in accordance with the principles of a preferred embodiment of the present invention.

DETAILED DESCRIPTION OF THE PREFERRED EMBODIMENT

Figure 4:
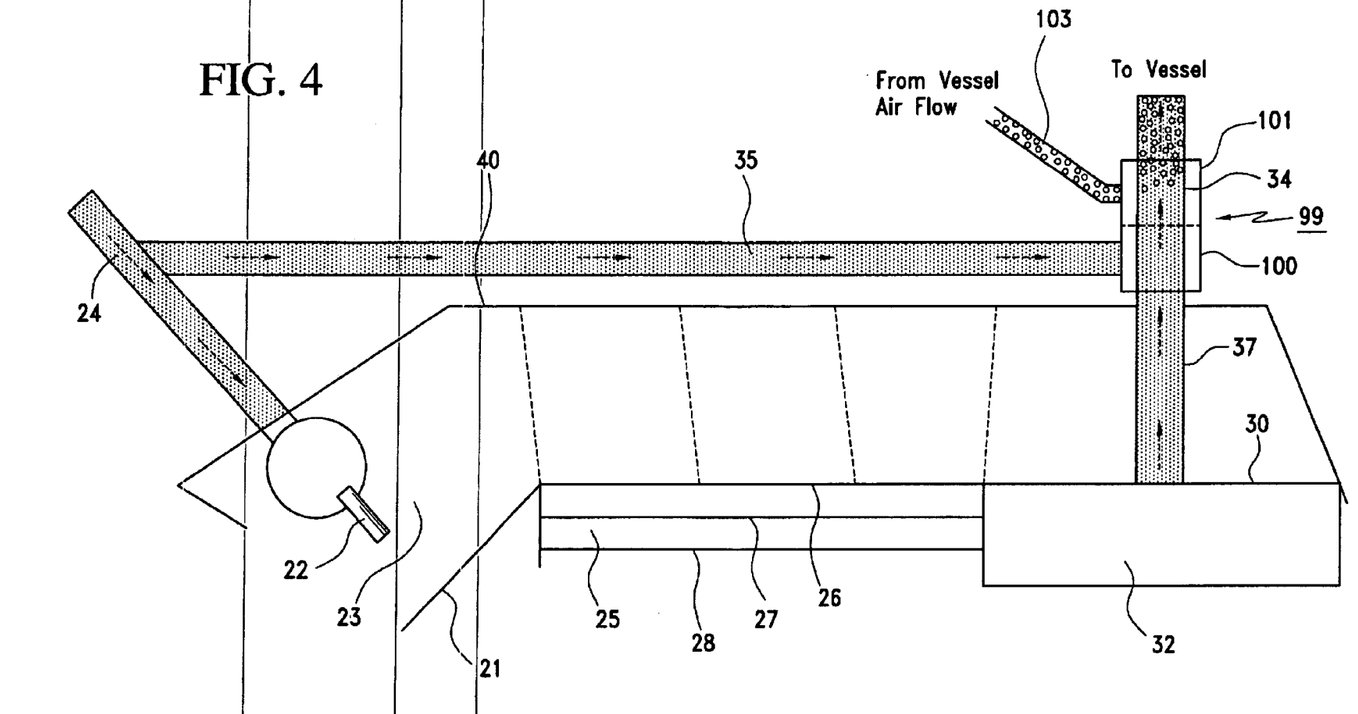
Figure 5:
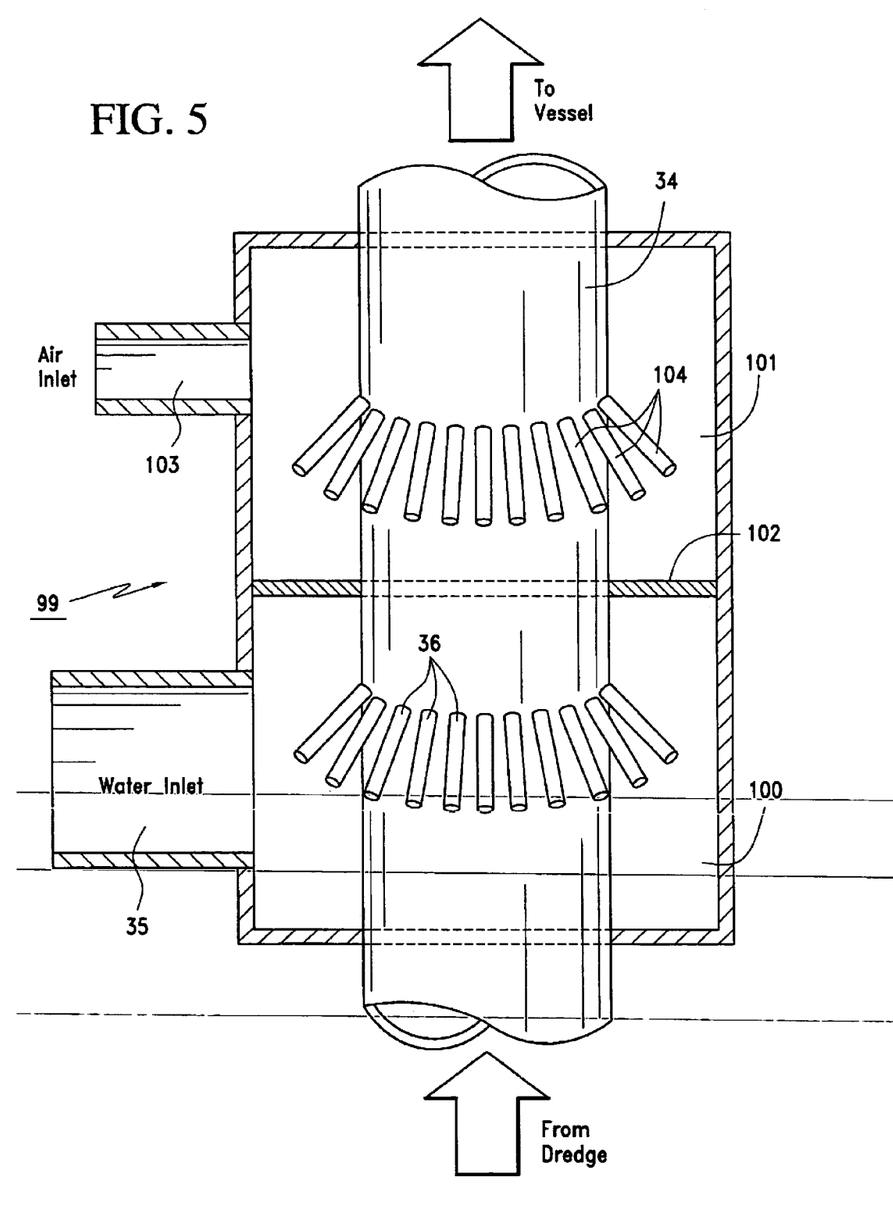
FIG. 5 is a schematic side view showing details of the dual compartment suction chamber of the preferred embodiment of the present invention.
Figure 6:
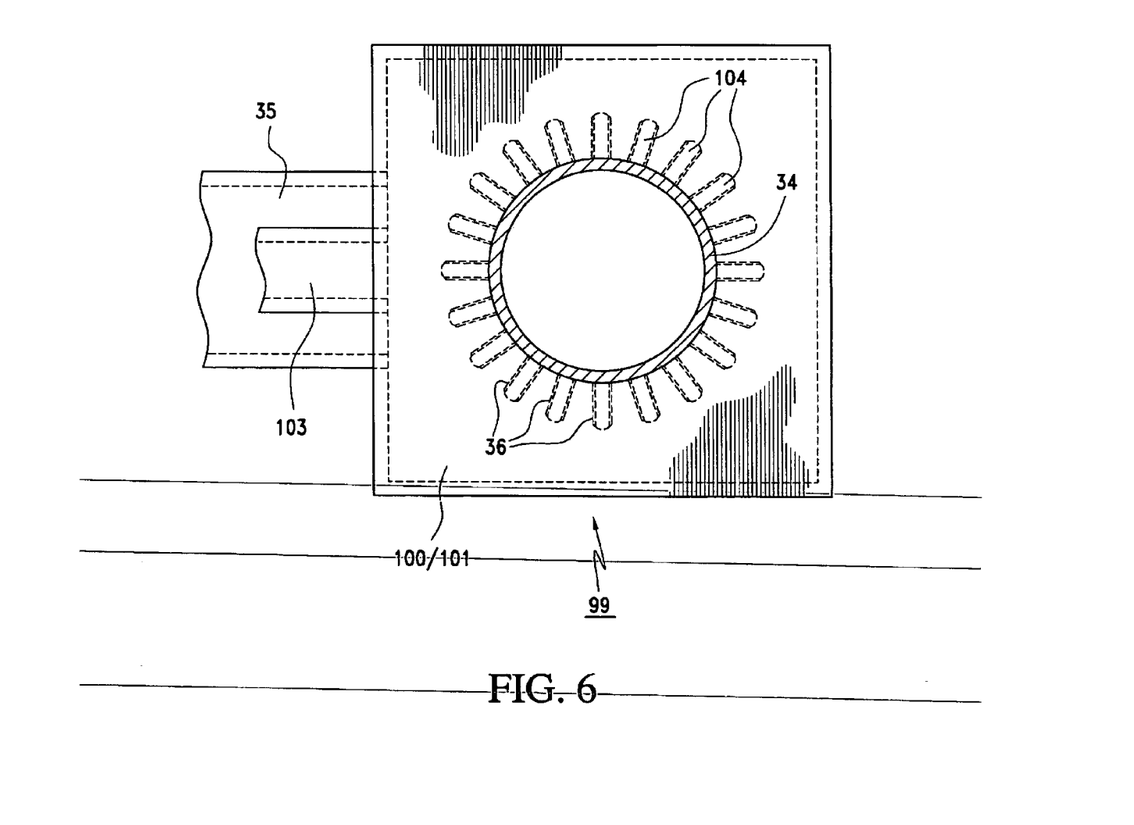
FIG. 6 is a schematic top view of the suction chamber compartments illustrated in FIG. 5.

As in the conventional shellfish dredging arrangements of FIGS. 1–3, the preferred dredging apparatus illustrated in FIGS. 4–6 is a hydraulic dredging apparatus that uses a common source of hydraulic pressure for both the excavation or digging jet or jets and the stream of water that transports excavated shellfish to the surface. The transport stream passes through a suction chamber to create a siphon effect that lifts the shellfish from a collection chamber for transport to a surface vessel or installation. The improvement provided by the invention is to include a dual compartment suction chamber that permits pressurized air to be injected into the transport stream so as to enable fine control of transport velocity and pressure without affecting the pressure of water supplied to the digging jet or jets.

Those skilled in the art will appreciate that the dual-compartment suction chamber of the preferred embodiment of the invention is not necessarily limited to use in connection with a particular dredging apparatus structure. Nevertheless, for purposes of illustration and in order to described the best mode of practicing the invention, the preferred embodiment will be described with reference to the dredging apparatus structure disclosed in U.S. Pat. No. 6,237,259, which shares some features with British Patent Publication No. 1,115,547, both of which are incorporated herein by reference. Initially, the excavation and separation portion of the dredging apparatus will be described in detail with reference to FIG. 4. This description will be followed by a description of the transport system shown in FIGS. 4–6, including a detailed description of the dual compartment suction chamber best illustrated in FIGS. 5 and 6. It is noted that all elements shared by the respective conventional and preferred dredging apparatuses of FIGS. 2 and 4 have been given common reference numerals.

As illustrated in FIG. 4, the dredging apparatus of the preferred embodiment of the invention is made up of a sled including a casing or frame 20 and a digging blade 21 that is inclined forwardly and downwardly relative to the main frame 20 of the sled so as to extend below the bottom of the frame into the sediments to be dredged. The sled may be supported by runners (not shown) in a manner similar to that illustrated in British Patent Publication No. 1,115,547, herein incorporated by reference, or other features designed to facilitate towing of the sled across the seabed, and may be of any construction suitable for supporting the elements described below in the appropriate marine environment.

A digging jet pipe 22 is fixed relative to the front surface of the digging blade 21 and is arranged to discharge water under pressure on to the surface of the seabed immediately ahead of the digging blade to fluidize the sediments as they pass onto the blade. The angle of the digging blade 21 is such that a surface section of the seabed cut by the blade travels up the slope of the blade and into the open end or mouth 23 of the frame 20. Water to the digging jet 22 is supplied by a pump situated on a vessel (not shown) through a hose 24 connected by suitable fittings to the digging jet in a manner similar to that disclosed in the aforementioned British publication.

Extending rearwardly from digging blade 21 is a first separating device 25 made up of a plurality of horizontal bars 26, 27, 28 arranged in a direction generally parallel to a direction of travel of the apparatus as it is towed by a vessel for separating shellfish collected by the digging blade from sediments in which the shellfish are entrained, and also for separating out immature shellfish having a size smaller than that of the shellfish to be collected. Horizontal bars 26, 27, 28 may optionally be arranged in three or more staggered layers to provide a more efficient sorting effect and facilitate movement of appropriately sized shellfish past the separating device, although those skilled in the art will appreciate that the use of multiple staggered layers is not essential, and that the structure of the separating device may be varied without departing from the scope of the invention.

To the rear of the first separating device 25 is a second separating device 29 in the form of a plate 30 having a plurality of openings of the type illustrated in FIG. 3 and arranged to permit passage of shellfish while excluding larger objects, including clumps of sediment not completely liquified by the digging water jet. Plate 30 forms the top of a collection chamber 32 at the rear of the sled.

Plate 30 also includes a collection chamber exit opening (not shown) having a larger diameter than any of the shellfish collection openings. The exit opening is provided with a fitting for attachment of a transport tube 34 extending to the towing vessel.

According to the principles of the preferred embodiment of the invention, transport tube 34 is surrounded by a suction chamber 99 that includes two compartments or sections 100 and 101. Compartment 100 is connected by a hose or pipe 35 to the hose 24 that also supplies water to the digging jet, and is separated from compartment 101 by a partition 102. One or more nozzles or other water directing devices 36 serve to direct pressurized water from hose or pipe 35 towards the surface in the direction of conveyance to create a suction effect and thereby siphon water from the collection chamber in the direction of arrow B with sufficient velocity to draw shellfish present in the collection chamber into the transport tube for conveyance to the towing vessel.

In order to increase or control the suction force, transport tube 34 is also supplied with air through a hose 103 connected between compartment 101 and an air compressor on the surface vessel or installation, and nozzles 104 which connect the interior of compartment 101 with the interior of transport tube 34. Air entering compartment 101 via hose 103 is injected into the transport tube, thereby providing the ability to vary the transport speed/pressure simply by varying the air pressure supplied to hose 103, without affecting the pressure of water supplied to the digging jets 22.

It will of course be appreciated by those skilled in the art that the construction, materials, and dimensions of the dual compartment suction chamber, and all constituents thereof, including the number and arrangement of the respective inlets and nozzles, will depend on the requirements of the specific application in which the suction chamber is to be used. For example, different types of shellfish will require different excavation and transport pressures, as well as different diameters of transport tube. As a result, the invention is not to be limited in any way by any dimensions and specific parameters that might be listed herein, except as provided in the appended claims.

With the foregoing caveat in mind, a version of suction chamber 99 that is especially suitable for the harvesting of clams will now be described in terms of specific dimensions and parameters. The suction chamber is in the form of a rectangular box split into equal halves and having side dimensions of 16" each and a height of 24". Transport tube 34 is a 10" pipe that runs through the center of the box. In the water compartment 100, 20 3"×⅝" nozzles 36 are placed around the pipe 34 at the same height in a ring formation. The nozzles 36 extend into the pipe such that ends of the nozzles are flush with the interior of the pipe, and are oriented at an angle relative to the transport direction of anywhere from zero to 90°, inclusive, so as to minimize interference between the streams of water exiting the jets and achieve optimal transport efficiency. Similarly, in the air compartment 101, 20 3"×½" nozzles 104 are placed around pipe 34 at the same height in a ring formation such that the ends of nozzles 104 that enter the pipe are flush with the interior of the pipe, and oriented at an angle corresponding to the angle of the water jets. Water is pumped into the water compartment of this illustrative implementation at a pressure of 2000 GPM, causing a vacuum to be created and thus pulling the clams into the pipe and forcing them upward. Air is pumped into the second compartment at the rate of 750 CFM and flows through nozzles 104 into pipe 34 where the water and clams are moving past.

Having thus described a preferred embodiment of the invention in sufficient detail to enable those skilled in the art to make and use the invention, it will nevertheless be appreciated that numerous variations and modifications of the illustrated embodiment may be made without departing from the spirit of the invention. For example, the air assist of the present invention may be used in connection with the specific shellfish harvesting device described in British Patent Publication No. 1,115,547 rather than the one described in U.S. Pat. No. 6,237,259, or in connection with any other shellfish harvesting system that utilizes a suction chamber or siphon effect to lift shellfish from a collection chamber and entrain the shellfish for transport to the surface. Consequently, it is intended that the invention not be limited by the above description or accompanying drawings, but that it be defined solely in accordance with the appended claims.

What is claimed is:

1. Apparatus for dredging shellfish from the bottom of a body of water, comprising:
   a sled arranged to be towed along said bottom;
   a pressurized water source arranged to direct a jet of water at sediments containing shellfish and cause said sediments and shellfish to be swept into said sled;
   a collection chamber arranged to receive shellfish that have been swept into said sled by said jet of water;
   a suction chamber connected via a pressurized water inlet to said pressurized water source and arranged such that pressurized water flowing into and through said suction chamber creates a vacuum that lifts shellfish from the collection chamber to a transport tube for transport to a surface of said body of water; and
   a pressurized air source connected to said transport tube above the pressurized water inlet, said pressurized air source being arranged to inject air into said water flowing through said suction chamber to increase its velocity and cushion shellfish during transport to the surface.

2. Apparatus as claimed in claim 1, wherein said suction chamber includes two compartments, one of which is a water compartment having an inlet for said pressurized water, and which is connected to the transport tube by a plurality of nozzles extending from an interior of said water compartment into said transport tube, and the other of which is an air compartment connected to said source of pressurized air, said air compartment having an inlet for said pressurized air, and which is connected to the transport tube by a plurality of nozzles extending from an interior of said air compartment into said transport tube.

3. Apparatus as claimed in claim 1, wherein said suction chamber includes a water compartment having an inlet for said pressurized water, and which is connected to the transport tube by a plurality of nozzles extending from an interior of said water compartment into said transport tube.

4. Apparatus as claimed in claim 1, wherein said suction chamber includes an air compartment connected to said source of pressurized air, said air compartment having an inlet for said pressurized air, and which is connected to the transport tube by a plurality of nozzles extending from an interior of said air compartment into said transport tube.

5. A system for dredging shellfish from the bottom of a body of water, comprising a source of pressurized water, at least one water jet arranged to receive water from the pressurized water source and direct it at shellfish-containing sediments, sorting plates for receiving the shellfish-containing sediments excavated by the at least one water jet and separating the shellfish from the sediments, a collection chamber for receiving the separated shellfish, and dual lifting compartments, one of which is connected to the pressurized water source for lifting shellfish from the collection chamber and entraining the shellfish for transport to the surface, and the other of which is arranged to received pressurized air for increasing the transport speed and lifting power while cushioning the shellfish as they are transported to the surface.

6. An arrangement for harvesting shellfish from the bottom of a body of water in which conveyance of harvested shellfish to the surface is carried out primarily by the same primary source of hydraulic pressure that is used to extract shellfish from sediments, comprising:
   means including a single primary hydraulic pressure source for:
      a. extracting shellfish from sediments; and
      b. conveying extracted shellfish to the surface, wherein said single primary hydraulic pressure source includes a source of pressurized water; and
   a secondary source of hydraulic pressure independent of the primary hydraulic pressure source, wherein the secondary hydraulic pressure source is arranged to be used to control conveyance speed and pressure without varying extraction pressure.

7. An arrangement as claimed in claim 6, wherein said secondary source of hydraulic pressure is pressured air supply.

8. An arrangement for harvesting shellfish from the bottom of a body of water in which conveyance of harvested shellfish to the surface is carried out primarily by the same primary source of hydraulic pressure that is used to extract shellfish from sediments, comprising a secondary source of hydraulic pressure independent of the primary hydraulic pressure source,
   wherein the secondary hydraulic pressure source is arranged to be used to control conveyance speed and pressure without varying extraction pressure, wherein said secondary source of hydraulic pressure is pressured air supply, wherein said shellfish are conveyed to the surface through a transport tube, and further comprising a suction chamber connected to the pressurized air supply, said suction chamber including two compartments, one of which is a water compartment having an inlet for pressurized water from said primary source of hydraulic pressure, and the other of which is an air compartment connected to said source of pressurized air.

9. An arrangement as claimed in claim 8, wherein said water compartment is connected to the transport tube by a plurality of water nozzles extending from an interior of said water compartment into said transport tube.

10. An arrangement as claimed in claim 8, wherein said air compartment is connected to the transport tube by a plurality of air nozzles extending from an interior of said air compartment into said transport tube.

* * * * *